June 19, 1962 H. R. BOYCE ET AL 3,039,557
TILT CAB FOR TRUCKS

Filed Feb. 19, 1960 4 Sheets-Sheet 1

INVENTORS
Horton R. Boyce,
BY Francis C. Fleck, &
William Fournier
Herbert Furman
ATTORNEY June 19, 1962

H. R. BOYCE ET AL 3,039,557

TILT CAB FOR TRUCKS

Filed Feb. 19, 1960

INVENTORS
Harlan R. Boyce,
BY Francis C. Fleck, &
William Fournier

Herbert Furman
ATTORNEY

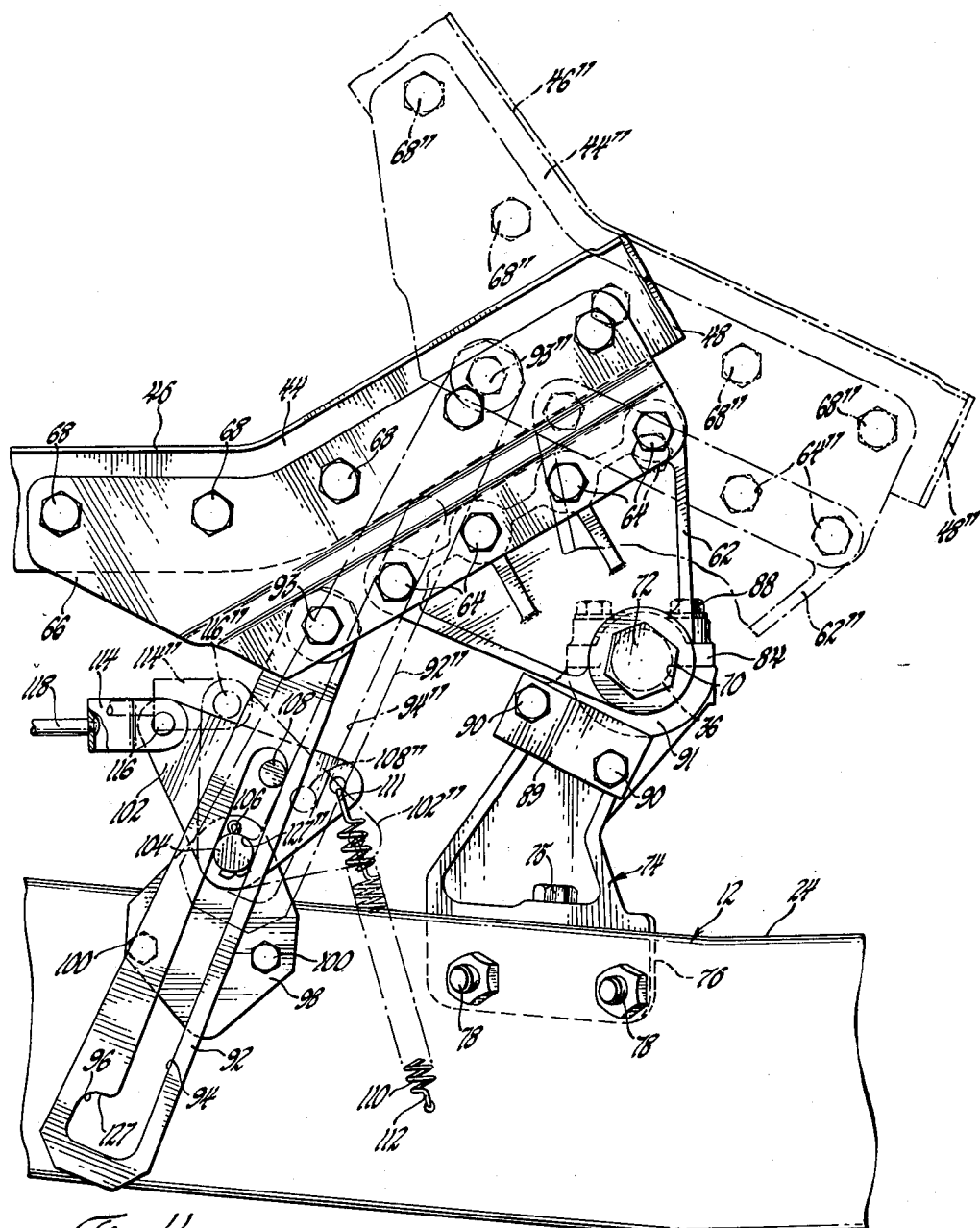

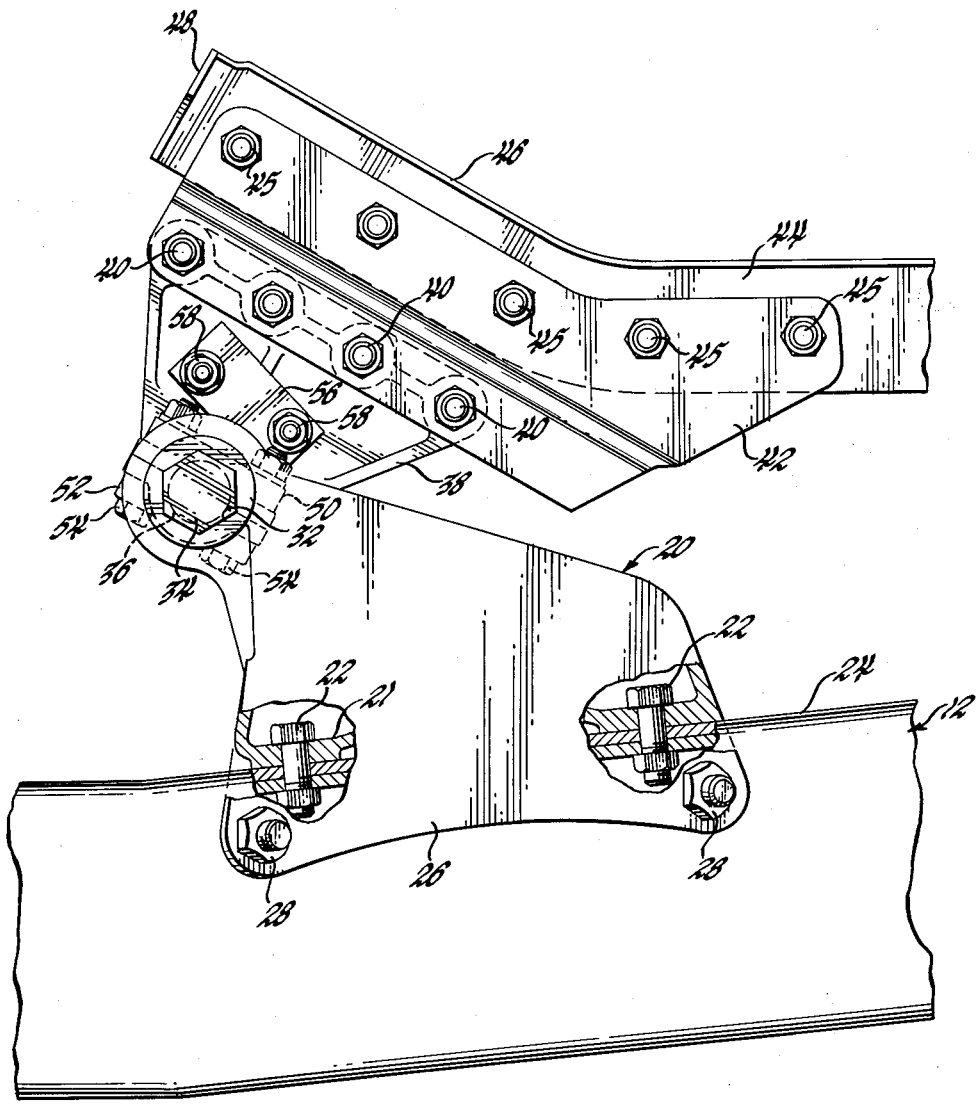

United States Patent Office 3,039,557
Patented June 19, 1962

3,039,557
TILT CAB FOR TRUCKS
Harlan R. Boyce, Francis C. Fleck, and William Fournier, Pontiac, Mich., assignors to General Motors Corporation, Detroit, Mich., a corporation of Delaware
Filed Feb. 19, 1960, Ser. No. 9,984
3 Claims. (Cl. 180—89)

This invention relates to tilt cabs for trucks and more particularly to a hinge, counterbalance, and check means for a tilting truck cab.

In the usual cab-over-engine truck, the power plant is mounted on the chassis frame beneath the truck cab and adjacent the front steerable wheels of the truck. In order to provide access to the power plant for repairs or otherwise, the cab is often pivoted adjacent its lower forward edge to the forward edge of the chassis frame for swinging movement forwardly of the chassis frame from a normal position to a forwardly tilted position.

In order to aid the operator in moving the cab between its normal and forwardly tilted positions, it is desirable to provide a counterbalance means to counterbalance the cab in both its normal and forwardly tilted positions and to aid the operator in moving the cab between these positions. It is also advantageous to provide a check means for the cab in its forwardly tilted position to limit forward movement of the cab and to accurately locate the cab in this position.

This invention provides a hinge, counterbalance, and check means for forwardly tilting truck cabs. The hinge and counterbalance means is very simple in construction, and yet adequately provides a hinge for the cab on the chassis frame, and counterbalances the cab in both normal and forwardly tilted positions and in an intermediate position. The check means limits and checks forward movement of the truck cab, and also holds and accurately locates the cab in its forwardly tilted position against the action of the counterbalance means.

In the preferred embodiment of the invention, pairs of anchor and bearing brackets are provided on each side of the cab and chassis frame. On one side of the cab and chassis frame, the anchor bracket is secured to the chassis frame, and anchors one end of a counterbalance torsion bar, while the bearing bracket is secured to the cab and is rotatably mounted on the torsion bar inboard of the anchor bracket. On the other side of the cab and chassis frame, the anchor bracket is secured to the cab and anchors the other end of the torsion bar, while the bearing bracket is secured to the chassis frame and rotatably supports the other end of the torsion bar inboard of the other anchored end thereof. Thus, the torsion bar provides the hinge pivot and also the counterbalance. The neutral position of the torsion bar, wherein the bar is not torqued or twisted in either direction, corresponds to the intermediate position of the truck cab, intermediate its normal and forwardly tilted positions, wherein the weight of the cab is substantially distributed equally to either side of the hinge axis. Thus, the torsion bar is torqued in one direction when the cab is moved to its normal position to counterbalance the weight of the cab in this position and bias the cab to its intermediate position, and is torqued in an opposite direction when the cab is moved to its forwardly tilted position to counterbalance the weight of the cab in that position and bias the cab to its intermediate position.

The check means is operative only in the forwardly tilted position of the truck cab and both limits forward movement of the cab and holds and accurately locates the cab in its forwardly tilted position against the counterbalance action of the torsion bar.

The primary object of this invention is to provide a new and improved hinge, counterbalance, and check means for tilting truck cabs. Another object of this invention is to provide an improved hinge and counterbalance means for a forwardly tilting truck cab wherein the counterbalance means also provides the hinge pivot means. A further object of this invention is to provide a new and improved check means between a pair of relatively swingable members.

These and other objects of this invention will be readily apparent from the following specification and drawings wherein:

FIGURE 4 is an enlarged view taken generally along the plane indicated by line 4—4 of FIGURE 2; and FIGURE 5 is an enlarged view taken generally along the plane indicated by line 5—5 of FIGURE 2, with parts thereof broken away for clarity of illustration.

Figure 1:
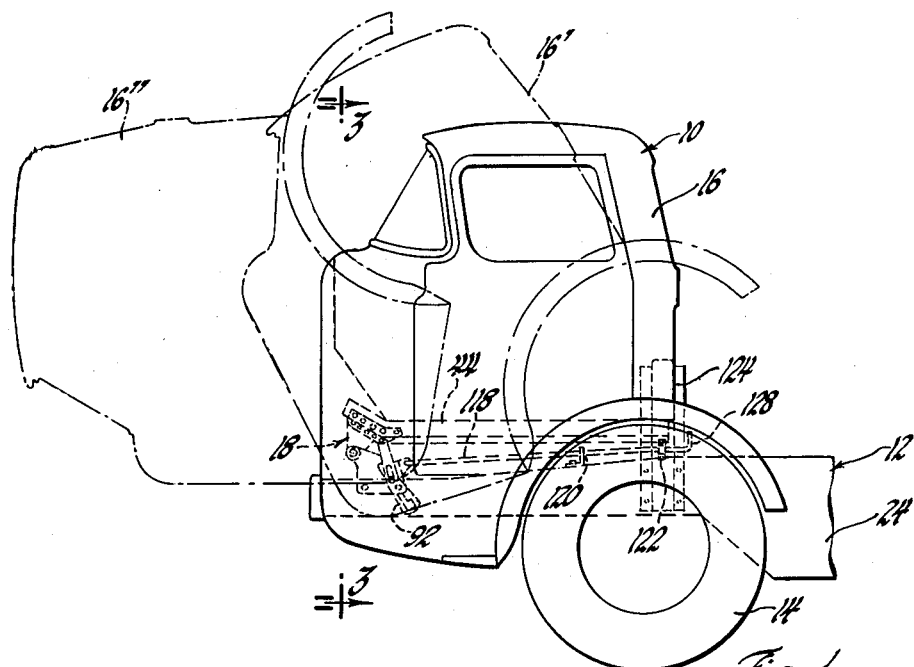
FIGURE 1 is a side elevational view of a truck having a forwardly tilting truck cab, and embodying a hinge, counterbalance, and check means according to this invention, with the truck cab being shown in normal position in full lines, and being shown in intermediate and forwardly tilted positions in dotted lines.
Figure 2:
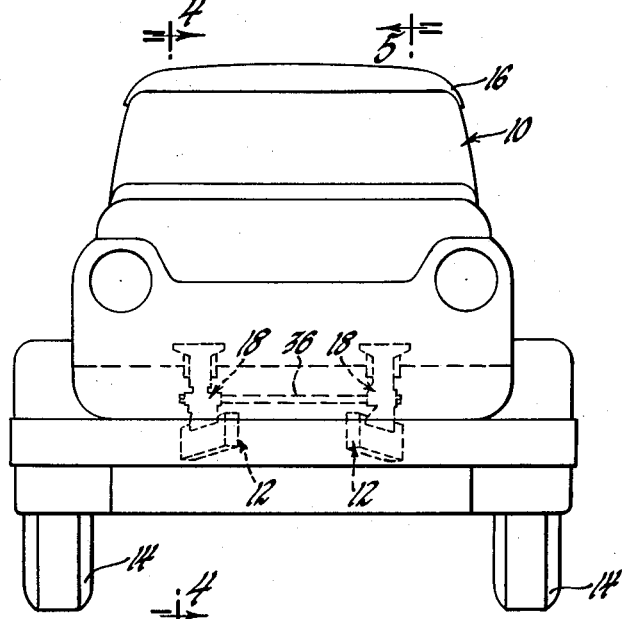
FIGURE 2 is a front elevational view of the truck of FIGURE 1.

Referring now particularly to FIGURE 1 of the drawings, a truck 10 includes a chassis frame 12, a pair of steerable front wheels 14 which support the forward end of the chassis frame, and a truck cab 16 which is supported on the chassis frame for movement between a normal position shown in full lines, an intermediate position 16' shown in dotted lines, and a forwardly tilted position 16'' also shown in dotted lines, by a hinge and counterbalance means 18 according to this invention. Although not shown in the drawings, the vehicle power plant is supported by frame 12 beneath cab 16 and access to the power plant may be had by moving the cab to either position 16' or 16''. The cab moves through an arc of approximately 90° during movement thereof between normal and forwardly tilted positions, and moves through an arc of approximately 45° when moving between its intermediate position 16' and either its normal or its forwardly tilted positions.

Figure 3:
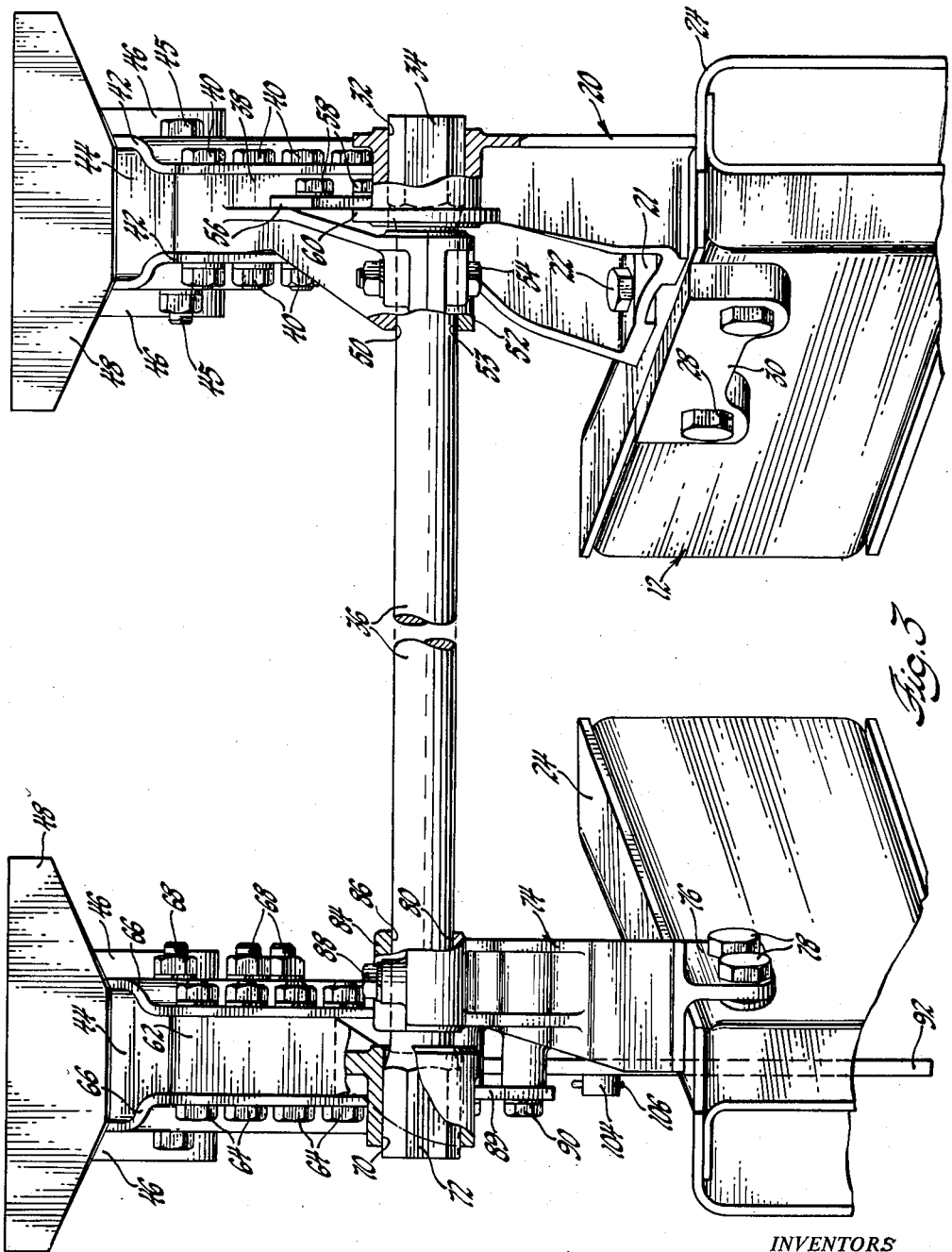
FIGURE 3 is an enlarged view of a portion of FIGURE 1, taken generally along the plane indicated by line 3—3 of FIGURE 1, with parts thereof broken away for clarity of illustration.

Referring now particularly to FIGURES 3 through 5, inclusive, the left hand hinge and the counterbalance means will be described. As best shown in FIGURES 3 and 5, a left hand anchor bracket 20 has the base wall 21 thereof bolted at 22 to the left hand chassis frame side rail 24. Bracket 20 further includes an outboard depending flange 26 which is bolted at 28 through rail 24 to an anchor plate 30 located on the inboard side of the rail. Although the rail is shown as of internesting channel construction, it will be understood it can be of other construction. Bracket 20 further includes a hexagonally shaped bore 32 which slidably receives a like-shaped enlarged end 34 of a torsion bar 36 to anchor end 34 against rotation.

A bearing bracket 38 is bolted at 40, at a number of places, to a pair of offset brackets 42. Brackets 42 straddle the cab side rail 44 and are bolted thereto at 45, at a number of places. Rail 44 is generally of upwardly opening channel-shaped cross-section and includes side flanges 46 secured to the cab floor and a forward closure plate 48. Bracket 38 further includes a semi-cylindrically shaped bearing portion 50 which seats on bar 36. A bearing cap 52 includes a semi-cylindrically shaped bearing portion 53 which seats on bar 36 and is bolted at 54 to bracket 38 to thereby rotatably mount the bracket and the left hand side rail 44 on the torsion bar 36. It will further be noted that the bearing bracket 38 is located inboard with respect to the anchor bracket 20 on the torsion bar 36. A plate 56 bolted at 58 to bracket 38 engages a flange 60 of bracket 20 to slidably locate bracket 38 on the torsion bar.

Referring now particularly to FIGURES 3 and 4 of the drawings, the right hand hinge will be described, and like numerals will be used for like parts. An anchor bracket 62 is bolted at 64, at a number of places, to a pair of offset brackets 66. Brackets 66 straddle the right hand cab side rail 44, which is of the same construction as the left hand car side rail, and are bolted thereto at 68, at a number of places. Bracket 62 further includes a hexagonally-shaped bore 70 which slidably receives the similarly shaped enlarged right hand end 72 of the torsion bar 36 to anchor end 72 against rotation.

A bearing bracket 74 is bolted at 75 to the right hand chassis frame side rail 24, and also includes a depending flange 76 bolted at 78 through the rail. Bracket 74 is similar to bracket 38 in that it includes a semicylindrically shaped bearing portion 80 which rotatably and slidably seats and supports the torsion bar 36 adjacent the right hand end thereof. A bearing cap 84 includes a semi-cylindrically shaped bearing portion 86 which seats on bar 36 and is bolted at 88 to the portion 82 of bracket 74. A stop plate 89 bolted at 90 to bracket 74 engages a flange 91 of bracket 62 to slidably locate bar 36 relative to bracket 74.

From the foregoing description, it can be seen that the left hand end of the torsion bar 36 is anchored against rotation to the left hand chassis frame side rail by the bracket 20, and that the right hand end of the torsion bar 36 is anchored against rotation to the right hand cab side rail by the bracket 62. Further, the left hand cab side rail is rotatably mounted on the torsion bar inboard of the left hand anchored end thereof, and the right hand chassis frame side rail rotatably supports the right hand end of the torsion bar inboard of the right hand anchored end thereof.

Referring now to FIGURE 1, it will be remembered that the neutral or untorqued position of bar 36 corresponds to the intermediate position 16' of the truck cab. Thus, when the truck cab is moved from its position 16' to its normal position 16, the torsion bar 36 will be twisted or torqued in a clockwise direction as viewed in FIGURE 1 to counterbalance the weight of the cab 16 in its normal position 16' and bias the cab to its position 16' so as to aid the operator in moving the cab from its normal position 16 to its intermediate position 16'. When the truck cab is moved from its position 16' to its position 16", the torsion bar 36 will be twisted or torqued in a counterclockwise direction as viewed in FIGURE 1 to counterbalance the weight of the truck cab in its forwardly tilted position 16" and to bias the cab to its position 16' so as to assist the operator in moving the truck cab from its position 16" to its position 16'. Since the weight of the cab is substantially equally distributed to either side of the hinge axis thereof in its position 16', the torsion bar 36 will maintain the truck cab in this position if so desired. It will also be noted that the weight of the truck cab aids the operator in twisting the torsion bar 36 when the truck cab is moved from its position 16' to either its normal or its forwardly tilted positions so that very little effort is required to move the truck cab from the intermediate position to either of the other positions. It should also be noted that the torsion bar 36 is not anchored against axial movement relative to brackets 20 and 62. The only restraint against axial movement of bar 36 is the torsional lock which exists in the positions 16 and 16" of the cab 16 since the bar 36 is torqued only in these positions of the truck cab.

Although not shown in the drawings, a suitable latch is provided to hold the truck cab in its normal position against the action of the torsion bar 36. Reference may be had to application Serial No. 667,571, Crockett et al., filed June 24, 1957 and now Patent 2,951,548, and assigned to the assignee of this invention for a suitable latch.

A check means is provided to limit forward swinging movement of the truck cab and to hold and accurately locate the truck cab in its forwardly tilted position. This check means will now be described with particular reference to FIGURES 3 and 4 of the drawings. A check link 92 is pivoted at 93 between the brackets 66 and includes a longitudinally extending closed slot 94, the lower end of which merges into an enlarged laterally extending slot portion 96. A support bracket 98 is bolted at 100 to the outboard side wall of the right hand rail 24. A bell crank lever 102 is pivoted to bracket 98 by a pin 104 and cotter key 106. Pin 104 acts as a detent member, as will be explained, and extends outwardly a sufficient distance so as to be received within slot 94, with the diameter of the pin being substantially equal to the width of slot 94. Lever 102 also mounts a pin 108 received in slot 94. A coil torsion spring 110 having one end 111 hooked to lever 102 and the other end 112 hooked to the right hand rail 24 continually biases lever 102 in a clockwise direction, as viewed in FIGURE 4, about the axis of pin 104 to hold pin 108 in engagement with the right hand edge of slot 94 and hold the left hand edge of the slot in engagement with pin 104. A clevis 114 pivoted at 116 to lever 102 is secured to one end of a shiftable rod 118. As best shown in FIGURE 1, rod 118 extends rearwardly through an angle guide bracket 120 fixed to the right hand rail 24 and a guide bracket 122 fixed to the rear frame cross member 124 which is generally of arcuate shape and is welded to each of the rails 24.

The operation of the check means upon movement of the cab between positions 16 and 16" will now be described; with the position of the parts of the check means being indicated by double primed numerals when the cab is in position 16".

When the truck cab 16 is in its normal position, pins 104 and 108 are located as shown in FIGURE 4. When the truck cab is moved from its position 16 to its intermediate position 16', the check link 90 moves upwardly and swings about the pivot 93 as the pins 104 and 108 slide against the left hand and right hand edges of slot 94, respectively, and move downwardly within the slot toward the lower end thereof. The friction between the pins and the edges of the slot offers very little, if any, resistance to movement of the truck cab to its position 16'. When the truck cab is thereafter moved from its position 16' to its forwardly tilted position 16", the pin 104 moves to the lower end of the slot 94 and into the slot portion 96, as shown in dot-dash lines in FIGURE 4. Since the spring 110 continually biases the lever 102 in a clockwise direction, the pin 108 swings the check link 92 slightly counter clockwise when pin 104 has reached the bottom of slot 94 so that pin 104 enters the slot portion 96 and engages the upper edge 127 of this slot portion which acts as a hold-open shoulder. The engagement of pin 104 with the edge 127 of slot portion 96 checks forward tilting movement of the truck cab and also holds and locates the truck cab in this position since the counterbalance action of torsion bar 36 tends to return the truck cab to its intermediate position or move the check link 92 downwardly as viewed in FIGURE 4.

If the operator later desires to move the truck cab to either its intermediate or normal position, he grasps the end 128 of rod 118, FIGURE 1, to shift this rod rearwardly against the action of springs 110 and 126. This will swing bell crank 102 counter-clockwise, as viewed in FIGURE 4, to move pin 108 into engagement with the left hand edge of slot 94 and swing the check link 92 slightly clockwise to move the edge 127 of slot portion 96 out of engagement with pin 104 so that the pin 104 will be located within slot 94. The torsion bar 36 will then return the truck cab to its intermediate position 16'.

Thus this invention provides a new and improved hinge counterbalance and check means for forwardly tilting truck cabs. The hinge and counterbalance means both rotatably supports the truck cab on the truck chassis frame and provides the counterbalancing force to counterbalance the truck cab in both its normal and forwardly tilted positions. The check means checks movement of the truck cab to its forwardly tilted position, and further holds and locates the truck cab in this position against the action of the counterbalance means. Thus, this invention provides a very advantageous and simple structure for use in forwardly tilting truck cabs.

We claim:

1. The combination comprising, a chassis frame, a vehicle cab adapted to be pivotally mounted on said frame for movement between a normal position wherein substantially all of the weight of said cab is located rearwardly of the hinge axis thereof, a forwardly tilted position wherein substantially all of the weight of the cab is located forwardly of the hinge axis thereof, and a predetermined intermediate position wherein the weight of said cab is substantially equally distributed to either side of the hinge axis thereof, an elongated torsion bar extending transversely of said cab and providing the hinge pivot therefor, first means anchoring one end of said bar on said chassis frame to one side of said cab, second means anchoring the other end of said bar on said cab to the other side thereof, first means rotatably mounting said one side of said cab on said bar adjacent said one end thereof, second means rotatably mounting said bar adjacent said other end thereof on said chassis frame to the other side of said cab, said anchoring means and said mounting means being arranged in asymmetrical pairs to each side of said cab to locate the end portions of said bar in opposite cantilever-like arrangement, the free untorqued position of said torsion bar corresponding to the intermediate position of said cab, said bar being torqued in one direction when said cab is moved from said intermediate to said normal position thereof to counterbalance said cab in said normal position and bias said cab to said intermediate position, said torsion bar being torqued in an opposite direction when said cab is moved from said intermediate to said tilted position to counterbalance said cab in said forwardly tilted position and bias said cab to said intermediate position.

2. The combination comprising, a chassis frame, a vehicle cab adapted to be pivotally mounted on said frame for movement between a normal position wherein substantially all of the weight of said cab is located rearwardly of the hinge axis thereof, a forwardly tilted position wherein substantially all of the weight of the cab is located forwardly of the hinge axis thereof, and a predetermined intermediate position wherein the weight of said cab is substantially equally distributed to either side of the hinge axis thereof, a pair of anchor members, means mounting one of said members on said chassis frame to one side of said cab, means mounting the other of said members on said cab to the other side thereof, an elongated torsion bar extending between and anchored against rotation on each of said members and providing the hinge pivot for said cab, a pair of bearing members rotatably mounted on said bar, means mounting one of said bearing members on said cab to said one side thereof adjacent said one anchor member, means mounting the other of said bearing members on said chassis frame to the other side thereof adjacent said other anchor member, said bearing and anchor members being arranged in asymmetrical pairs at each side of said cab to chassis frame and rotatably mount said cab on said frame and locate the end portions of said bar in opposite cantilever-like arrangement, the free untorqued position of said torsion bar corresponding to the intermediate position of said cab, said bar being torqued in one direction when said cab is moved from said intermediate to said normal position thereof to counterbalance said cab in said normal position and bias said cab to said intermediate position, said torsion bar being torqued in an opposite direction when said cab is moved from said intermediate to said tilted position to counterbalance said cab in said forwardly tilted position and bias said cab to said intermediate position.

3. The combination comprising, a chassis frame, a vehicle cab adapted to be pivotally mounted on said frame for movement between a normal position wherein substantially all of the weight of said cab is located rearwardly of the hinge axis thereof, a forwardly tilted position wherein substantially all of the weight of the cab is located forwardly of the hinge axis thereof, and a predetermined intermediate position wherein the weight of said cab is substantially equally distributed to either side of the hinge axis thereof, a pair of anchor members, means mounting one of said members on said chassis frame to one side of said cab, means mounting the other of said members on said cab to the other side thereof, an elongated torsion bar extending between and anchored against rotation on each of said members and providing the hinge pivot for said cab, a pair of bearing members rotatably mounted on said bar, means mounting one of said bearing members on said cab to said one side thereof inboard of and adjacent said one anchor member, means mounting the other of said bearing members on said chassis frame inboard of and adjacent said other anchor member and to the other side of said cab to arrange said bearing and anchor members in asymmetrical pairs at each side of said cab and chassis frame to rotatably mount said cab on said frame and locate the end portions of said bar in opposite cantilever-like arrangement, the free untorqued position of said torsion bar corresponding to the intermediate position of said cab, said bar being torqued in one direction when said cab is moved from said intermediate to said normal position thereof to counterbalance said cab in said normal position and bias said cab to said intermediate position, said torsion bar being torqued in an opposite direction when said cab is moved from said intermediate to said tilted position to counterbalance said cab in said forwardly tilted position and bias said cab to said intermediate position.

References Cited in the file of this patent

UNITED STATES PATENTS

| | | |
|---|---|---|
| 1,264,828 | McClarren | Apr. 30, 1918 |
| 2,210,519 | Wollensak | Aug. 6, 1940 |
| 2,602,957 | Anderson | July 15, 1952 |
| 2,760,805 | Stevens et al. | Aug. 28, 1956 |
| 2,864,121 | Imber et al. | Dec. 16, 1958 |
| 2,867,841 | Baldauf | Jan. 13, 1959 |
| 2,947,376 | Norrie | Aug. 2, 1960 |
| 2,951,548 | Crockett et al. | Sept. 6, 1960 |